(12) United States Patent
Roerig

(10) Patent No.: US 10,081,564 B1
(45) Date of Patent: Sep. 25, 2018

(54) GLASS BOTTLE FORMING MACHINE

(71) Applicant: PYROTEK INC., Spokane, WA (US)

(72) Inventor: William Roerig, Spokane, WA (US)

(73) Assignee: PYROTEK, INC., Spokane, WA (US)

( * ) Notice: Subject to any disclaimer, the term of this patent is extended or adjusted under 35 U.S.C. 154(b) by 0 days.

(21) Appl. No.: 14/278,457

(22) Filed: May 15, 2014

(51) Int. Cl.
*C03B 11/10* (2006.01)

(52) U.S. Cl.
CPC .......... *C03B 11/10* (2013.01); *C03B 2215/50* (2013.01)

(58) Field of Classification Search
CPC .... C03B 9/3535; C03B 2215/50; C03B 11/10
USPC ................. 65/152, 267, 355, 323, 360, 315
See application file for complete search history.

(56) References Cited

U.S. PATENT DOCUMENTS

| 3,472,639 | A | * | 10/1969 | Mumford | ............... | C03B 9/3535 |
| | | | | | | 65/307 |
| 4,261,724 | A | | 4/1981 | Sarkozy | | |
| 4,842,637 | A | | 6/1989 | Bolin et al. | | |
| 4,853,023 | A | | 8/1989 | Bolin | | |
| 4,861,365 | A | * | 8/1989 | Zsifkovits | ............. | C03B 9/3535 |
| | | | | | | 65/323 |
| 4,983,203 | A | | 1/1991 | Erb et al. | | |
| 5,332,413 | A | | 7/1994 | Trahan et al. | | |
| 6,832,494 | B2 | | 12/2004 | Fenton | | |
| 8,316,670 | B2 | | 11/2012 | Newsom et al. | | |

OTHER PUBLICATIONS

PCT International Search Report from PCT/US2015/031139.

* cited by examiner

*Primary Examiner* — Alison L Hindenlang
*Assistant Examiner* — Mohamed K Ahmed Ali
(74) *Attorney, Agent, or Firm* — Fay Sharpe LLP

(57) ABSTRACT

During the glass bottle forming process a pair of arms is used to form the bottle one after another is rapid succession; a bottle is formed in a glass machine in approximately three to four seconds. The machine is exposed to extremes in temperature as well as extremes in pressure. One of the chief issues with the operation of this machine are the interruption of use of the machine if the machine should fail or begin to produce defective bottles. Any shutdown of the machine leads to disruption in production and is unwelcome.

5 Claims, 4 Drawing Sheets

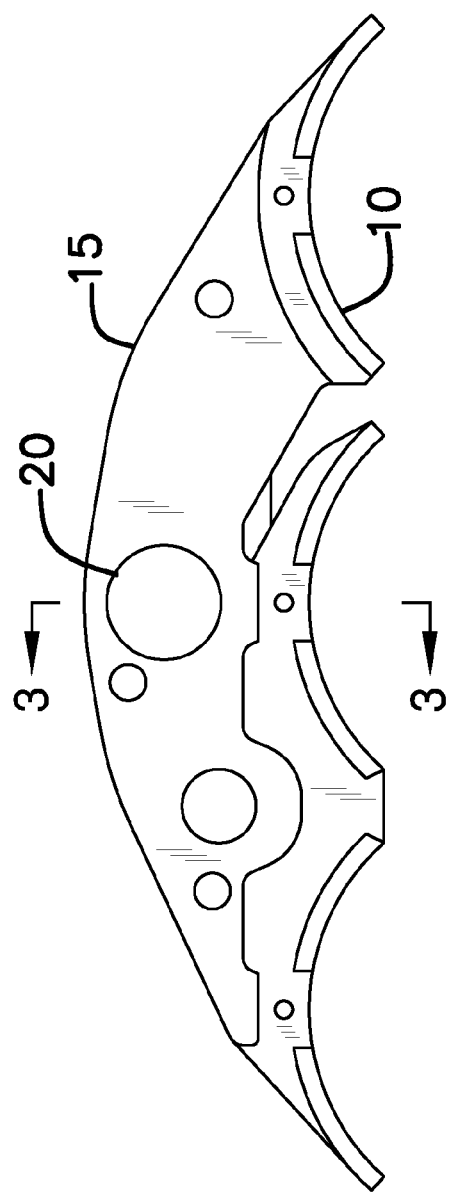
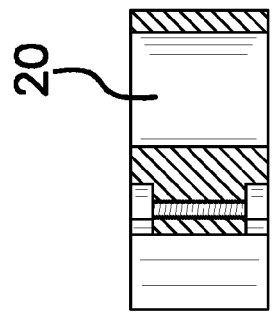
FIG. 2
FIG. 3

GLASS BOTTLE FORMING MACHINE

A. FIELD OF THE INVENTION

This is a device to help improve the efficiency during the making of glass bottles. While the process of making glass bottles is quite complicated, this affects one portion of the bottle making process and, specifically, the mold assembly arms. The process to make a bottle happens within a matter of seconds so the machinery is under constant stress and is exposed to extremes in temperatures. Because of these extremes, there is the danger of the arms warping. In the event of warping the machine will need to be taken out of production.

B. PRIOR ART

There are prior art references to glass forming machines and represented examples can be found in Bolin, U.S. Pat. No. 4,853,023.

In the Bolin reference, a pair of parallel arms with three arcuate members are placed. The arms themselves rotate around a central pivot point and serve to press the bottle into shape.

It is the design of the arm that has been improved by this particular application. With this application, the design will be used with a particular machine.

Instead of the arm pivoting on two points, the arm itself will pivot on one point which creates greater consistency in terms of the bottle making process and eliminates the possibility of the arm warping requiring taking the machine from production.

BRIEF SUMMARY OF THE INVENTION

The bottle making process begins with molten glass (a gob) which is funneled from a tank and placed in a blank mold; the molten glass will be in the neighborhood of 2,700 degrees Fahrenheit.

The blank mold has three openings and a "gob" is placed in each blank space. A plunger is placed through the bottom of the gob in the center of the molten glass to begin to form the interior of the bottle; the threads of the bottle are formed at the same time as the interior of the bottle in this blank mold.

The newly formed bottle in the blank mold is then inverted and placed in a second mold, which is commonly referred to as a blow mold. Once the bottle is positioned in the blow mold, compressed air is forced into the bottle, through the opening in the top of the bottle which enlarges the bottle to fit the mold. The compressed air will allow the molten glass to be formed to fit the mold and form a bottle.

The gob becomes a bottle when it is dropped into one of the blank spaces and then inverted to complete the shape of the bottle.

The bottle then leaves the blow mold assembly and travels down a conveyor belt system to undergo the finishing touches before becoming the final product ie. a bottle. The entire process of inserting the gob into the block, inserting a plunger and putting it under a blow mold occurs in less than three to five seconds.

In the prior art a particular machine is used with the central pivot point around an arm assembly. Two arcuate arms rotate around that central pivot point to press against two halves of the arm assembly against each other therefore shaping the bottle. In the prior art this type of machine is commonly referred to as an individual section machine.

In the prior art there were two arm references each with two pivots. The challenge arose when the arms warped which would create defective bottles because the pressure on the molds was not equal when the mold sections were pressed together.

In this application instead of the arms rotating in two separate pivot points there would be one pivot point, which was in the center of the arm assembly and this would ensure that the bottle molds were pressed equally together with equal force to shape the bottle correctly.

Because the arm assembly is subjected to a great deal of stress and extremely elevated temperatures, the problem of the arm assembly warping is likely to occur after a period of time. The issue of the arm assembly warping will become evident as defective bottles are produced. When that occurs the machine must be stopped and parts must be replaced.

However, when this machine is stopped it requires an extended period of time to allow the machine to cool down before maintenance is even possible. This will produce delays in production with resultant cost considerations.

The bottle making process itself is not altered by this particular device. However, the maintenance of the machines and the time needed for the maintenance of the machines is greatly reduced by this improvement because the frequency of warping is greatly reduced.

BRIEF DESCRIPTION OF THE DRAWINGS

FIG. 2 is a bottom view of the arm assembly.
FIG. 3 is a view according to Line 3-3 of FIG. 2.

NUMBERING REFERENCES

5—Arm Assembly
7—Center Post
8—Securing Pin
10—Arcuate Members
11—First Plate
11P—Prior Art First Plate
12—Plate Assembly
12P—Prior Art Plate Assembly
15—Mold Arms
20—Center Opening
22—Supporting Arms
25—Securing Bolt

DETAILED DESCRIPTION OF THE EMBODIMENTS

The process starts with molten glass being formed in a central tank. Glass is heated in a tank, the temperature of which is approximately 2700° F. That gives the glass the consistency of honey and as the molten glass leaves the tank, it is cut by a pair of shears. This molten gob, as it is referred to in the industry, travels down a chute into one of three blank molds. The three blank molds operate in unison.

In the current application the arm assembly 5 is comprised of three arcuate members 10 as well as a center opening 20. Unlike the prior art the three arcuate members 10 are all part of the mold assembly as one piece.

Figure 1:
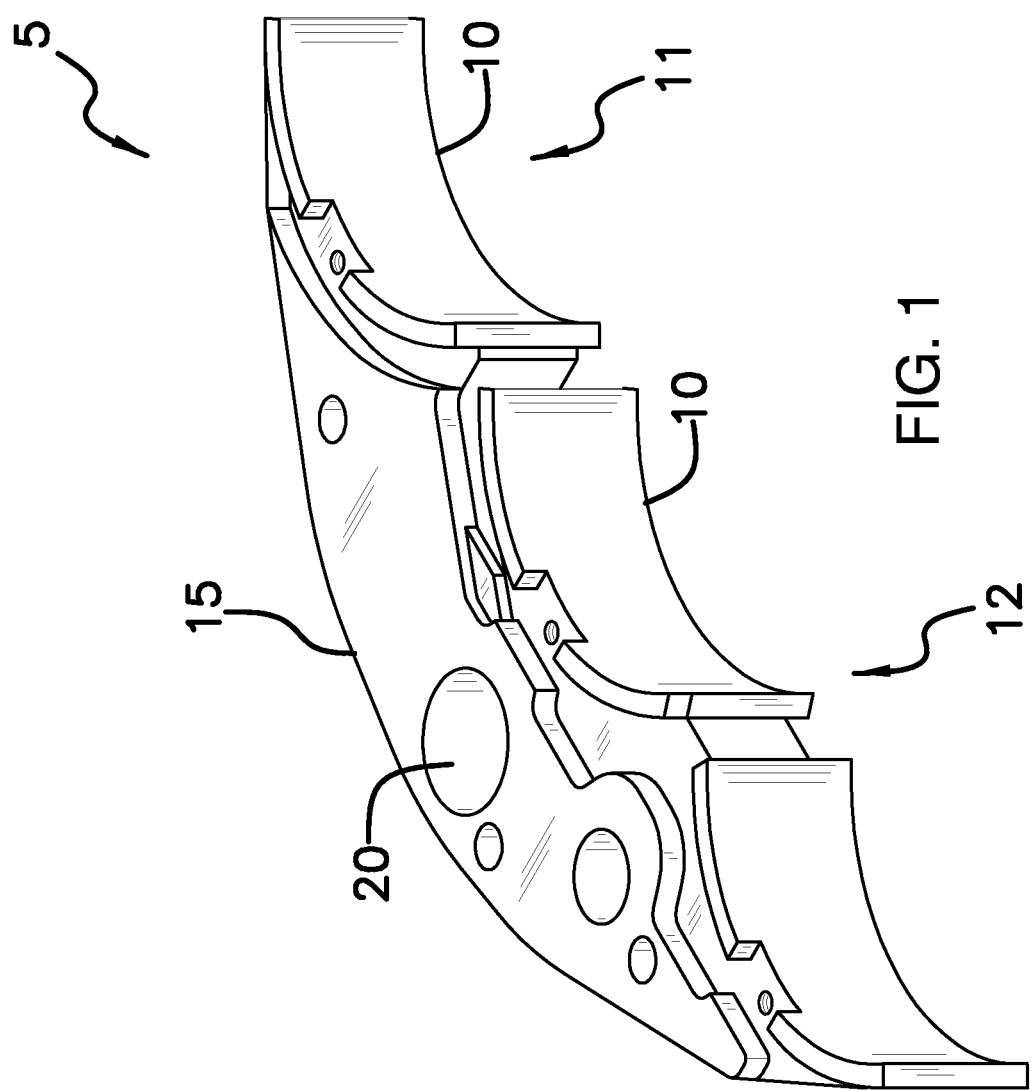
FIG. 1 is an isometric view of one of the arm assemblies.
Figure 4:
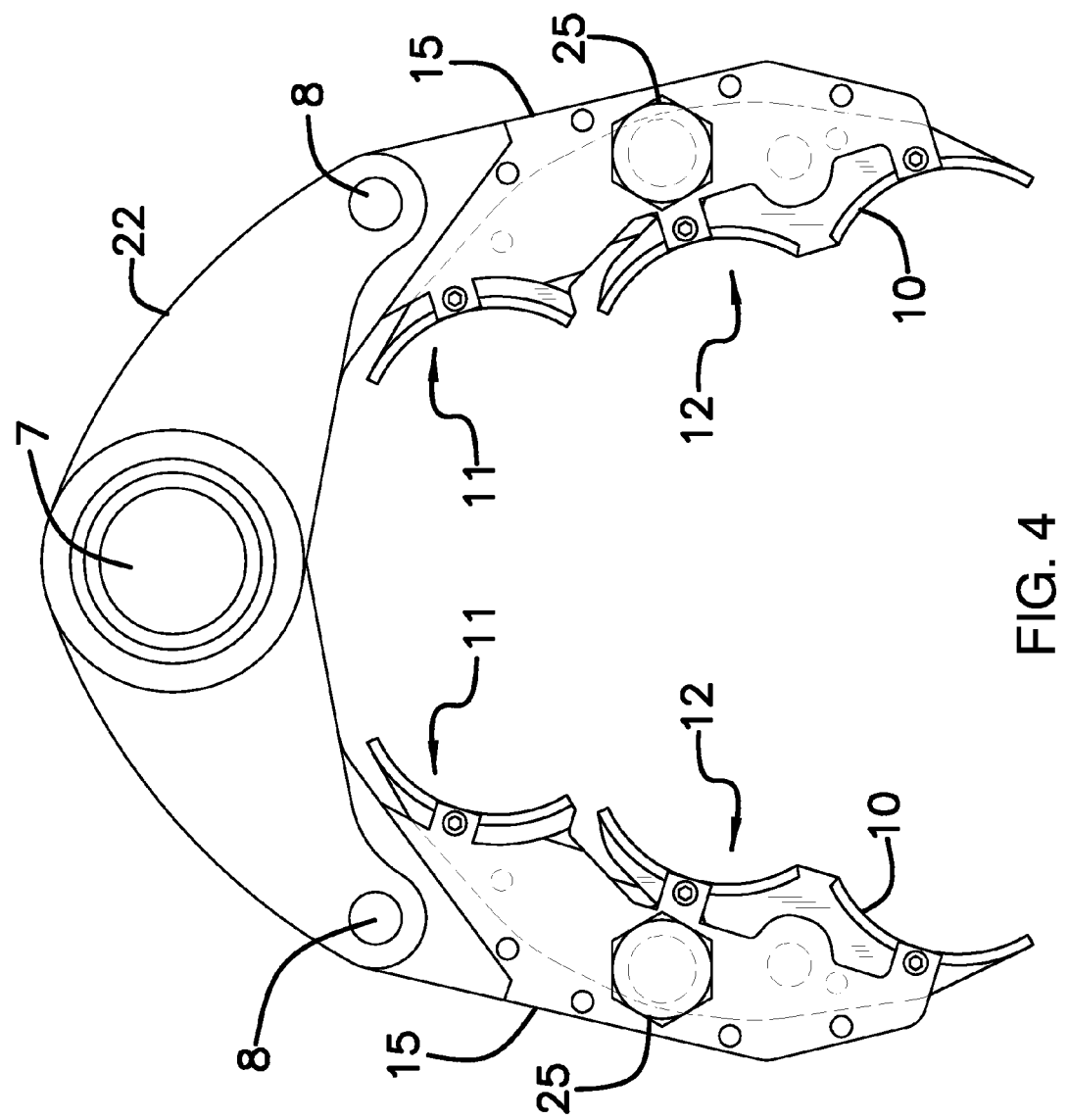
FIG. 4 is a top view of the arm assembly depicting the arcuate members.

A pair of arms 15 on the molds is secured to the center post 7 of the glass making machine such as depicted in FIG. 4. A pair of supporting arms 22 and a securing pin 8 will secure the center post to the mold arms 15. On one side of the mold arms are three arcuate members 10. The gob or molten glass travels from the tank of liquid glass into the area of the arcuate members to form the bottle. The process of making a bottle is very quick and it is important the machine and any selected material be constructed from very durable material that will be capable of withstanding extremes in temperature and pressure.

As the supporting arms 22 rotate inward both of the mold arms 15 are moved together during the bottle making process. At a preset interval the gob will be inserted into the space that is formed by the two arcuate members 10 will come together to form the bottle in the blank mold. The arms pivot around a central pivot point 7. The supporting arms 22 and mold arms 15 move in rapid succession as each bottle is formed and it takes approximately three to four seconds to form a bottle with this process. The arms are subjected to extremes in temperature.

The bottle in the blank mold process is formed when the mold arms come together and a plunger is inserted through the bottom which initially forms the bottle. Threads are also placed on the top of the bottle at the same time as the plunger forms the interior of the bottle while in the blank mold. At this stage the bottle has threads and the beginnings of an appropriate opening.

The mold arms 15 of the blank mold opens and then the bottles are inverted and placed on a another set of molds, which are called blow molds, which blows compressed of air into the bottle to expand the bottle to take the shape of the mold. After the compressed air is blown into the opening that was originally started by the plunger in the blank mold, the bottle will take shape into what is normally considered a normal bottle shape.

The blow mold is then opened and the bottle is then transported out of the mold area and down a conveyor belt system where the bottle is heated to control the temperature drop in the bottle to ensure that the bottle does not crack during the cooling process. During this annealing process, a solution is sprayed on the bottle to coat the bottle to prevent nicks and scratches on the bottle.

The bottle is then inspected for quality and defects with defective bottles being discarded. The process of forming a bottle in the molds occurs in a matter of seconds.

Those molds are subjected to extremes in temperature as well as extreme pressure. Consequently it is imperative that the molds are made from very durable material.

Because of the extremes in temperatures and constant pressure the arcuate members 10 of the mold arms 15 assemblies may warp, typically at the outside edge of the arcuate member 10.

If there is any warping, the bottle will not be formed correctly and this will be detected upon inspection. Once the defective bottle is discovered the machine must be shut down for needed repairs at significant loss of production as the machine must be allowed to cool down before any repairs are undertaken.

Figure 5:
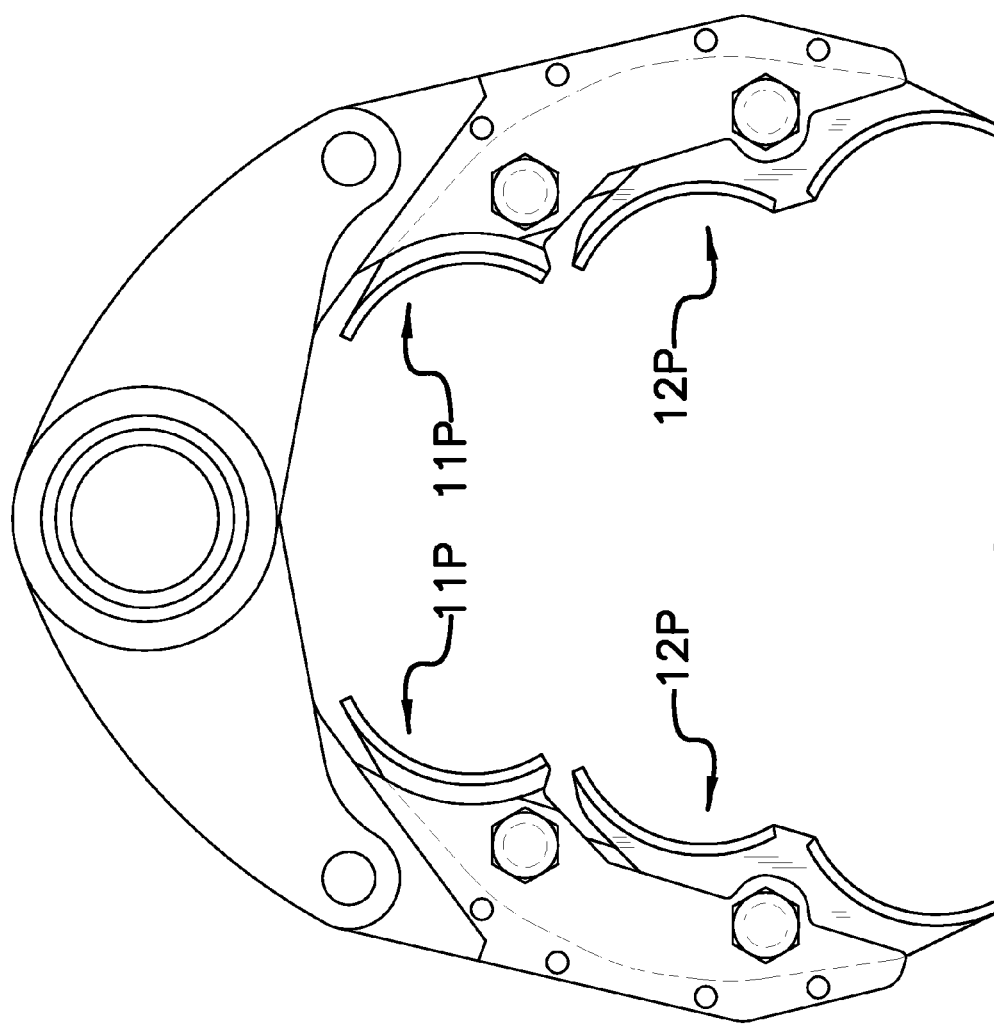
FIG. 5 is a depiction of the prior art.

In the prior art as depicted in FIG. 5 a first plate 11P is formed as part of the mold arm. A second plate assembly 12P would be secured to the mold arm the use of a bolt.

In the current application a securing bolt 25 is used to secure the mold arm 15 securing pin 8. In this manner the entire mold arm 15 can be removed and a substitute mold arm 15 can replace it after appropriate cooling of the machine. In the prior art it was necessary to remove the plate assembly 12P and replace the plate assembly 12P but also align it correctly to the first plate 11P. This resulted in significant down time for the machine.

With the current application the securing bolt 25 is simply removed which allows the entire mold arm to be removed and a new mold arm to be put in its place. The arcuate surfaces would already be aligned in the replacement mold arm.

This warping, which will occur at some point in time with any glass making machine, would shut down the assembly line of bottles and require some cooling off period while the bottle machine was being maintained. Because of the close clearances that are involved, it was difficult in the prior art to make a machine that would make maintenance possible with such close clearances without substantial down time for the machine.

In this application a center securing means, most likely a bolt 25 is placed through a center opening 20 allows the entire mold arm to be removed. In the prior art two bolts were used to secure the arcuate surfaces to the mold arms.

The current application allows for the set of arms to be replaced as a unit to minimize the down time for the machine concept achieves that result. In the prior art the machine would be shut down and cooled and then the machine may be maintained. After the part was repaired the machine could then be put back into production for the bottle making process. After the machine has been cooled down, it requires that the machine again be heated to an acceptable temperature before any bottles can be made. In the prior art this process required time to heat the machine. With this application less time would be involved to "reheat" the machine.

While the embodiments of the invention have been disclosed, certain modifications may be made by those skilled in the art to modify the invention without departing from the spirit of the invention.

The inventor claims:

1. A glass bottle forming machine which is comprised of an arm assembly;
   a. a center post;
      wherein the center post is part of a glass bottle forming machine;
   b. a pair of supporting arms;
      wherein the pair of supporting arms are secured to the center post; and
   c. a pair of mold arms, each of said mold arms comprising a plate having at least three arcuate blank mold members formed integrally as a one piece common body, said mold arms and said supporting arms further defining a central passage configured to receive a nut and bolt assembly to secure each mold arm to an associated supporting arm;
   wherein each of said mold arms has one pivot point, at said central passage relative to said associated supporting arm.

2. The machine of claim 1 wherein said central passage and nut and bolt assembly constitute a single point of attachment between said mold blank and each of said mold arms.

3. The machine of claim 1 wherein said central passage is disposed substantially in a middle of a length of each mold arm.

4. The machine of claim 1 wherein a gap is formed between two adjacent arcuate blank mold members; said gap penetrating only a portion of a width of said common body.

5. The machine of claim 1 wherein said mold arm rotates only at about a center of each mold arm.

* * * * *